(12) United States Patent
Gustin et al.

(10) Patent No.: US 10,536,526 B2
(45) Date of Patent: Jan. 14, 2020

(54) APPARATUS AND METHOD FOR VIRTUALIZING A CONNECTION TO A NODE IN AN INDUSTRIAL CONTROL AND AUTOMATION SYSTEM

(71) Applicant: Honeywell International Inc., Morristown, NJ (US)

(72) Inventors: Jay W. Gustin, Scottsdale, AZ (US); Laurence A. Clawson, Cave Creek, AZ (US); James A. Strilich, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 917 days.

(21) Appl. No.: 14/574,744

(22) Filed: Dec. 18, 2014

(65) Prior Publication Data

US 2015/0378328 A1    Dec. 31, 2015

Related U.S. Application Data (60) Provisional application No. 62/016,938, filed on Jun. 25, 2014.

(51) Int. Cl.
*G05B 13/04* (2006.01)
*H04L 29/08* (2006.01)

(52) U.S. Cl.
CPC .................................. *H04L 67/12* (2013.01)

(58) Field of Classification Search
CPC .......... G05B 15/02; G05B 13/04; H04L 67/12
See application file for complete search history.

(56) References Cited

U.S. PATENT DOCUMENTS

| | | |
|---|---|---|
| 4,679,189 A | 7/1987 | Olson et al. |
| 4,736,797 A | 4/1988 | Restarick, Jr. et al. |
| 5,537,414 A | 7/1996 | Takiyasu et al. |
| 5,566,356 A | 10/1996 | Taketsugu |
| 5,664,195 A | 9/1997 | Chatterji |
| 5,749,053 A | 5/1998 | Kusaki et al. |
| 5,898,826 A | 4/1999 | Pierce et al. |

(Continued)

FOREIGN PATENT DOCUMENTS

| | | |
|---|---|---|
| DE | 4134207 C1 | 4/1993 |
| DE | 10314721 A1 | 11/2004 |

(Continued)

OTHER PUBLICATIONS

International Search Report dated Jul. 5, 2007 in connection with International Application No. PCT/US2006/048334; 3 pages.

(Continued)

*Primary Examiner* — Shean Tokuta
*Assistant Examiner* — Juan C Turriate Gastulo (57) ABSTRACT

An apparatus includes first hardware configured to communicate, via a first interface, over a supervisory control network with one or more components of an industrial process control and automation system. The apparatus also includes second hardware configured to communicate, via a second interface, with a computing platform that virtualizes at least one other component of the industrial process control and automation system. The apparatus further includes a third interface configured to transport information between the first and second hardware.

11 Claims, 7 Drawing Sheets

(56) References Cited

U.S. PATENT DOCUMENTS

| | | | |
|---|---|---|---|
| 6,141,769 A | 10/2000 | Petivan et al. | |
| 6,192,232 B1 | 2/2001 | Iseyama | |
| 6,256,297 B1 | 7/2001 | Haferbeck et al. | |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,522,664 B1 * | 2/2003 | Kawahara | G05B 19/4185 370/466 |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Salch et al. | |
| 6,917,584 B2 | 7/2005 | Kuwabara | |
| 6,961,310 B2 | 11/2005 | Cain | |
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,062,676 B2 | 6/2006 | Shinohara et al. | |
| 7,111,171 B2 | 9/2006 | Collens et al. | |
| 7,152,181 B2 | 12/2006 | Fung et al. | |
| 7,158,525 B2 | 1/2007 | Daffner et al. | |
| 7,174,564 B1 | 2/2007 | Weatherspoon et al. | |
| 7,184,413 B2 | 2/2007 | Beyer et al. | |
| 7,190,961 B2 | 3/2007 | Burr | |
| 7,193,991 B2 | 3/2007 | Melpignano et al. | |
| 7,203,743 B2 | 4/2007 | Shah-Heydari | |
| 7,236,477 B2 | 6/2007 | Emeott et al. | |
| 7,236,987 B1 | 6/2007 | Faulkner et al. | |
| 7,240,188 B2 | 7/2007 | Takata et al. | |
| 7,269,611 B2 | 9/2007 | Miki | |
| 7,275,157 B2 | 9/2007 | Cam Winget | |
| 7,278,049 B2 | 10/2007 | Bartfai et al. | |
| 7,283,494 B2 | 10/2007 | Hammel et al. | |
| 7,289,466 B2 | 10/2007 | Kore et al. | |
| 7,313,151 B2 | 12/2007 | Gilsdorf et al. | |
| 7,342,896 B2 | 3/2008 | Ayyagari | |
| 7,363,365 B2 | 4/2008 | Ocko et al. | |
| 7,366,114 B2 | 4/2008 | Park et al. | |
| 7,421,268 B2 | 9/2008 | Lee et al. | |
| 7,436,797 B2 | 10/2008 | Shepard et al. | |
| 7,440,735 B2 | 10/2008 | Karschnia et al. | |
| 7,460,865 B2 | 12/2008 | Nixon et al. | |
| 7,496,059 B2 | 2/2009 | Yoon | |
| 7,496,078 B2 | 2/2009 | Rahman | |
| 7,515,606 B2 | 4/2009 | Kim et al. | |
| 7,516,356 B2 | 4/2009 | Chen et al. | |
| 7,545,941 B2 | 6/2009 | Sovio et al. | |
| 7,586,930 B2 | 9/2009 | Koski | |
| 7,603,129 B2 | 10/2009 | Gonia et al. | |
| 7,620,409 B2 | 11/2009 | Budampati et al. | |
| 7,620,842 B2 | 11/2009 | Fung et al. | |
| 7,688,802 B2 | 3/2010 | Gonia et al. | |
| 7,742,394 B2 | 6/2010 | Budampati et al. | |
| 7,788,524 B2 | 8/2010 | Wing et al. | |
| 7,788,970 B2 | 9/2010 | Hitt et al. | |
| 7,801,094 B2 | 9/2010 | Gonia et al. | |
| 7,802,016 B2 | 9/2010 | Elmers-Klose et al. | |
| 7,821,981 B2 | 10/2010 | Smith et al. | |
| 7,826,373 B2 | 11/2010 | Kolavennu et al. | |
| 7,848,223 B2 | 12/2010 | Budampati et al. | |
| 7,853,221 B2 | 12/2010 | Rodriguez et al. | |
| 7,876,722 B2 | 1/2011 | Hodson et al. | |
| 7,881,253 B2 | 2/2011 | Budampati et al. | |
| 7,933,240 B2 | 4/2011 | Budampati et al. | |
| 8,041,772 B2 | 10/2011 | Amanuddin et al. | |
| 8,085,672 B2 | 12/2011 | Subramanian et al. | |
| 8,107,446 B2 | 1/2012 | Shoarinejad | |
| 8,107,511 B2 | 1/2012 | Budampati et al. | |
| 8,108,853 B2 | 1/2012 | Bale et al. | |
| 8,204,078 B2 | 6/2012 | McLaughlin | |
| 8,209,403 B2 | 6/2012 | Szabo et al. | |
| 8,280,057 B2 | 10/2012 | Budampati et al. | |
| 8,285,326 B2 | 10/2012 | Carmody et al. | |
| 8,406,220 B2 | 3/2013 | McLaughlin et al. | |
| 8,413,227 B2 | 4/2013 | Chen | |
| 8,429,647 B2 | 4/2013 | Zhou et al. | |
| 8,451,789 B2 | 5/2013 | Junell et al. | |
| 8,463,319 B2 | 6/2013 | Budampati et al. | |
| 8,498,201 B2 | 7/2013 | Budampati et al. | |
| 8,514,861 B2 | 8/2013 | Barker, Jr. et al. | |
| 8,565,196 B2 | 10/2013 | Yang et al. | |
| 8,644,192 B2 | 2/2014 | Budampati et al. | |
| 8,681,676 B2 | 3/2014 | Budampati et al. | |
| 8,756,412 B2 | 6/2014 | Pulini et al. | |
| 8,811,231 B2 | 8/2014 | Budampati et al. | |
| 8,924,498 B2 | 12/2014 | McLaughlin | |
| 8,929,228 B2 | 1/2015 | Budampati et al. | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0152373 A1 * | 10/2002 | Sun | H04L 63/0209 713/150 |
| 2002/0176396 A1 | 11/2002 | Hammel et al. | |
| 2003/0003912 A1 | 1/2003 | Melpignarto et al. | |
| 2003/0005149 A1 | 1/2003 | Haas et al. | |
| 2003/0177150 A1 | 9/2003 | Fung et al. | |
| 2003/0212768 A1 | 11/2003 | Sullivan | |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0107009 A1 | 6/2004 | Fehrer et al. | |
| 2004/0162919 A1 * | 8/2004 | Williamson | H04L 12/5601 709/250 |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0276233 A1 | 12/2005 | Shepard et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104291 A1 | 5/2006 | Rodriguez et al. | |
| 2006/0104301 A1 | 5/2006 | Beyer et al. | |
| 2006/0128349 A1 | 6/2006 | Yoon | |
| 2006/0130049 A1 | 6/2006 | Elmers-Klose et al. | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0147294 A1 | 6/2007 | Bose et al. | |
| 2007/0153677 A1 | 7/2007 | McLaughlin et al. | |
| 2007/0153789 A1 | 7/2007 | Barker, Jr. et al. | |
| 2007/0155423 A1 | 7/2007 | Carmody et al. | |
| 2007/0237137 A1 | 10/2007 | McLaughlin | |

(56) References Cited

U.S. PATENT DOCUMENTS

| | | | |
|---|---|---|---|
| 2007/0261052 | A1 | 11/2007 | Bale et al. |
| 2007/0282178 | A1 | 12/2007 | Hodson et al. |
| 2008/0043637 | A1 | 2/2008 | Rahman |
| 2008/0051060 | A1 | 2/2008 | Lee et al. |
| 2008/0140844 | A1 | 6/2008 | Halpern |
| 2008/0267259 | A1 | 10/2008 | Budampati et al. |
| 2008/0273547 | A1 | 11/2008 | Phinney |
| 2009/0022121 | A1 | 1/2009 | Budampati et al. |
| 2009/0034441 | A1* | 2/2009 | Budampati ............ H04L 45/00 370/310 |
| 2009/0060192 | A1 | 3/2009 | Budampati et al. |
| 2009/0086692 | A1 | 4/2009 | Chen |
| 2009/0109889 | A1 | 4/2009 | Budampati et al. |
| 2009/0138541 | A1 | 5/2009 | Wing et al. |
| 2010/0042869 | A1 | 2/2010 | Szabo et al. |
| 2010/0128699 | A1 | 5/2010 | Yang et al. |
| 2010/0287548 | A1 | 11/2010 | Zhou et al. |
| 2011/0305206 | A1 | 12/2011 | Junell et al. |
| 2012/0101663 | A1 | 4/2012 | Fervel et al. |
| 2012/0117416 | A1 | 5/2012 | McLaughlin |
| 2013/0024585 | A1* | 1/2013 | Takahashi ........... G06F 13/4291 710/74 |
| 2013/0151849 | A1* | 6/2013 | Graham .................... H04L 9/32 713/164 |
| 2014/0292535 | A1 | 10/2014 | Petite et al. |
| 2014/0336786 | A1* | 11/2014 | Asenjo ............... G05B 19/4185 700/17 |
| 2015/0055451 | A1* | 2/2015 | Holmberg ............ H04L 49/557 370/218 |
| 2015/0227443 | A1* | 8/2015 | Wu .................... H04L 12/4625 714/5.1 |

FOREIGN PATENT DOCUMENTS

| | | | |
|---|---|---|---|
| EP | 1081895 | A1 | 3/2001 |
| EP | 1401171 | A2 | 3/2004 |
| EP | 1439667 | A2 | 7/2004 |
| GB | 2427329 | A | 12/2006 |
| WO | WO 01/035190 | A2 | 5/2001 |
| WO | WO 03/079616 | A1 | 9/2003 |
| WO | WO 2004/047385 | A2 | 6/2004 |
| WO | WO 2004/114621 | A1 | 12/2004 |
| WO | WO 2006/017994 | A1 | 2/2006 |
| WO | WO 2006/053041 | A1 | 5/2006 |

OTHER PUBLICATIONS

Written Opinion of International Searching Authority dated Jul. 5, 2007 in connection with International Application No. PCT/US2006/048334; 7 pages.

International Search Report dated Nov. 22, 2007 in connection with International Application No. PCT/US2007/069614; 4 pages.

Written Opinion of International Searching Authority dated Nov. 22, 2007 in connection with International Application No. PCT/US2007/069614; 5 pages.

International Search Report dated Nov. 27, 2007 in connection with International Application No. PCT/US2007/069710; 4 pages.

Written Opinion of International Searching Authority dated Nov. 27, 2007 in connection with International Application No. PCT/US2007/069710; 6 pages.

International Search Report dated Apr. 15, 2008 in connection with International Application No. PCT/US2007/069705; 4 pages.

Written Opinion of International Searching Authority dated Apr. 15, 2008 in connection with International Application No. PCT/US2007/069705; 5 pages.

International Search Report dated Dec. 10, 2007 in connection with International Application No. PCT/US2007/069717; 5 pages.

Written Opinion of International Searching Authority dated Dec. 10, 2007 in connection with International Application No. PCT/US2007/069717; 5 pages.

European Search Report dated Oct. 6, 2008 in connection with European Patent Application No. 08161387; 3 pages.

Communication pursuant to Article 94(3) EPC dated Apr. 2, 2009 in connection with European Patent Application No. 07 761 784.3; 9 pages.

Aiello, et al.; "Wireless Distributed Measurement System by Using Mobile Devices"; IEEE Technology and Applications; Sep. 5-7, 2005; Sofia, Bulgaria; 4 pages.

Chen et al.; "Dependability Enhancement for IEEE 802.11 Wireless LAN with Redundancy Techniques"; IEEE Intl. Conference on Dependable Systems and Networks; 2003; 8 pages.

Kolavennu; "WNSIA MAC Layer"; ISA SP100 Meeting; Feb. 14, 2007; 24 pages. [See especially, p. 17]; 24 pages.

Pereira; "A Fieldbus Prototype for Educational Purposes", IEEE Instrumentation & Measurement Magazine, New York, NY; vol. 7, No. 1; Mar. 2004; 8 pages.

Song; "Fault Recovery Port-based Fast Spanning Tree Algorithm (FRP-FAST) for the Fault-Tolerant Ethernet on the Arbitrary Switched Network Topology"; IEEE; 2001; 8 pages.

Sun, et al.; "An Efficient Deadlock-Free Tree-Based Routing Algorithm for Irregular Wormhole-Routed Networks Based on the Turn Model";IEEE; 2004; 10 pages.

Taherian, et al.; "Event Dissemination in Mobile Wireless Sensor Networks"; IEEE; 2004; 3 pages.

Zhang, et al., "A Learning-based Adaptive Routing Tree for Wireless Sensor Networks"; IEEE; Journal of Communications, vol. 1, No. 2; May 2006; 9 pages.

"XYR 5000 Wireless Transmitters, Honeywell Solutions for Wireless Data Acquisiton and Monitoring," www.acs.honeywell.com, Feb. 2006, 6 pages.

Strilich, et al.; "Gateway Offering Logical Model Mapped to Independent Underlying Networks"; U.S. Appl. No. 14/269,903, filed May 5, 2014; 49 pages.

\* cited by examiner

APPARATUS AND METHOD FOR VIRTUALIZING A CONNECTION TO A NODE IN AN INDUSTRIAL CONTROL AND AUTOMATION SYSTEM

CROSS-REFERENCE TO RELATED APPLICATION AND PRIORITY CLAIM

This application claims priority under 35 U.S.C. § 119(e) to U.S. Provisional Patent Application No. 62/016,938 filed on Jun. 25, 2014. This provisional patent application is hereby incorporated by reference in its entirety.

TECHNICAL FIELD

This disclosure relates generally to industrial process control and automation systems. More specifically, this disclosure relates to an apparatus and method for virtualizing a connection to a node in an industrial control and automation system.

BACKGROUND

Industrial process control and automation systems are routinely used to automate large and complex industrial processes. Distributed process control and automation systems are routinely arranged in different "levels." For example, controllers in lower levels are often used to receive measurements from sensors and generate control signals for actuators. Controllers in higher levels are often used to support higher-level functions, such as scheduling, planning, and optimization operations.

In a distributed control system, devices on certain levels are often connected to associated communication networks using special hardware interfaces. Because of such tight couplings with the hardware interfaces, these devices often cannot be virtualized, which may be needed or desired for older legacy devices or other types of devices.

SUMMARY

This disclosure provides an apparatus and method for virtualizing a connection to a node in an industrial control and automation system.

In a first embodiment, an apparatus includes first hardware configured to communicate, via a first interface, over a supervisory control network with one or more components of an industrial process control and automation system. The apparatus also includes second hardware configured to communicate, via a second interface, with a computing platform that virtualizes at least one other component of the industrial process control and automation system. The apparatus further includes a third interface configured to transport information between the first and second hardware.

In a second embodiment, a system includes a network interface device and a computing platform. The network interface device includes first hardware configured to communicate, via a first interface, over a supervisory control network with one or more components of an industrial process control and automation system. The network interface device also includes second hardware and a third interface configured to transport information between the first and second hardware. The computing platform is configured to virtualize at least one other component of the industrial process control and automation system. The second hardware is configured to communicate, via a second interface, with the computing platform.

In a third embodiment, a method includes using first hardware of a network interface device to communicate, via a first interface, over a supervisory control network with one or more components of an industrial process control and automation system. The method also includes using second hardware of the network interface device to communicate, via a second interface, with a computing platform that virtualizes at least one other component of the industrial process control and automation system. The method further includes transporting information between the first and second hardware using a third interface of the network interface device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
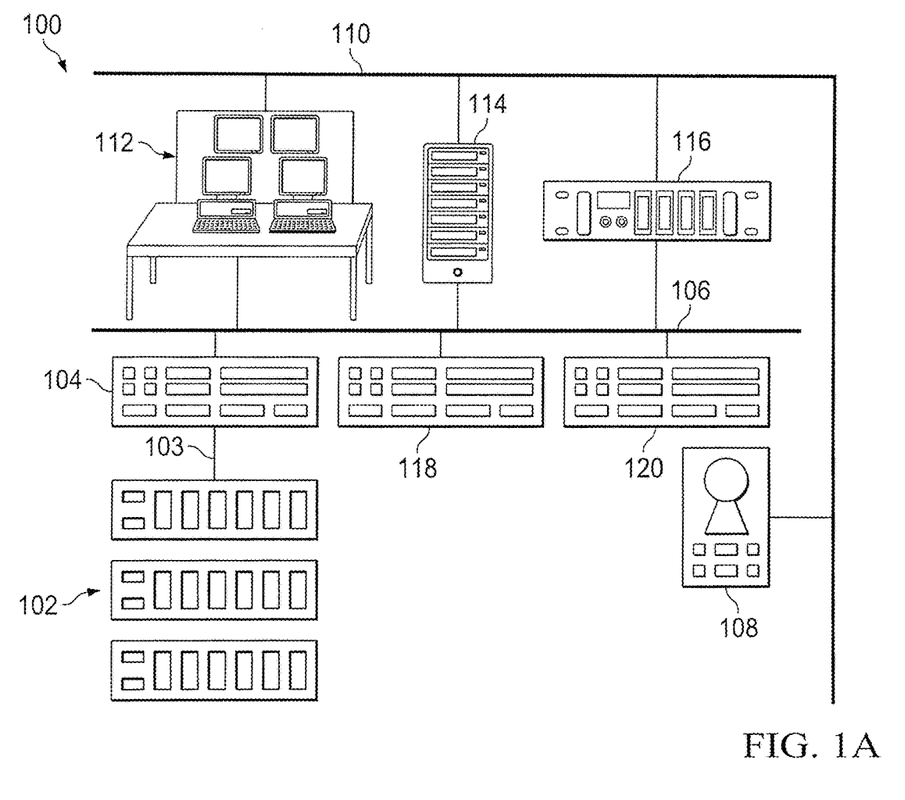
FIGS. 1A and 1B illustrate an example industrial process control and automation system according to this disclosure

FIGS. 1A and 1B illustrate an example industrial process control and automation system 100 according to this disclosure. As shown in FIG. 1A, the system 100 includes one or more controllers 102, which are often said to reside within or form a part of a "Level 1" controller network in a control and automation system. Each controller 102 is capable of controlling one or more characteristics in an industrial process system. A process system generally represents any system or portion thereof configured to process one or more products or other materials in some manner. For instance, the controllers 102 could receive measurements from one or more sensors and use the measurements to control one or more actuators.

The controllers 102 communicate via a network 103 with at least one gateway 104. The network 103 represents one or more communication paths that support interactions with the controllers 102 using an industrial communication protocol. The network 103 represents any suitable industrial process control network.

In this example, the controllers 102 communicate with higher-level devices and systems via the gateway(s) 104. Here, each gateway 104 facilitates communication between the network 103 and a supervisory network 106, such as a local control network (LCN). Each gateway 104 includes any suitable structure facilitating communication with one or more devices via a supervisory network. The supervisory network 106 represents a network facilitating communication among higher-level process control and automation devices and systems.

The system 100 could also include one or more advanced controllers 108 that communicate over an advanced control network 110. The advanced controllers 108 represent controllers that are newer, more technologically advanced, or more feature-rich than the controllers 102. Similarly, the control network 110 could represent a newer, more technologically advanced, or more feature-rich network for transporting control information, such as an Internet Protocol (IP)-based network. In particular embodiments, the advanced controllers 108 could represent C300 controllers from HONEYWELL INTERNATIONAL INC., and the control network 110 could represent a FAULT TOLERANT ETHERNET (FTE) or other redundant IP-based network.

Various other components in the system 100 support a wide range of process control and automation-related functions. For example, one or more operator consoles 112 can be used by operators to interact with the system 100. At least one supervisory controller 114 and at least one server 116 provide higher-level control in the system 100. For instance, the supervisory controller 114 and/or server 116 could perform more advanced planning or scheduling operations, execute higher-level control strategies, or perform other functions. At least one application processing platform 118 can be used to automate various procedures in the system 100. At least one historian 120 can be used to collect and store data associated with operation of the system 100 over time. Various ones of these components are often said to reside within or form a part of a "Level 2" supervisory network in a control and automation system.

Each operator console 112 includes any suitable structure for facilitating operator interactions, such as an EXPERION STATION TPS (EST) from HONEYWELL INTERNATIONAL INC. Each controller 114 includes any suitable structure for providing supervisory control, such as an APPLICATION CONTROL ENVIRONMENT-TPS (ACE-T) node from HONEYWELL INTERNATIONAL INC. Each server 116 represents any suitable computing device, such as an EXPERION SERVER TPS from HONEYWELL INTERNATIONAL INC. (or a redundant pair of such servers). Each application processing platform 118 includes any suitable structure for executing automated procedures, such as an APPLICATION MODULE (AM) from HONEYWELL INTERNATIONAL INC. Each historian 120 includes any suitable structure for storing data, such as a HISTORY MODULE (HM) from HONEYWELL INTERNATIONAL INC.

As described above, in a distributed control system, devices on certain levels are often connected to associated communication networks using special hardware interfaces. For example, operator consoles 112 and controllers 114 on "Level 2" of the system 100 are often coupled to an LCN or other supervisory network 106 using special hardware interfaces installed on their computer platforms. Because of this, these devices often cannot be virtualized. An example of this problem occurs with the attempted virtualization of HONEYWELL EXPERION TPS nodes, such as EST, ESVT, ACET, and EAPP nodes. These are WINDOWS-based nodes that are interfaced to an LCN via special PCI hardware interfaces known as LCNP4/LCNP4e interfaces.

This disclosure describes techniques that decouple hardware/platform dependency and enable the virtualization of legacy or other devices. This is accomplished by moving the LCN or other network interface out of a legacy or other device and installing the network interface as an independent "network interface device." A mechanism is also provided to establish communications between the legacy or other device and the network interface device, such as via an Ethernet network. In this way, communications over an LCN or other supervisory network 106 are supported using the network interface device, but this functionality is decoupled from the legacy or other control device, allowing the legacy or other control device to be virtualized.

Figure 1B:
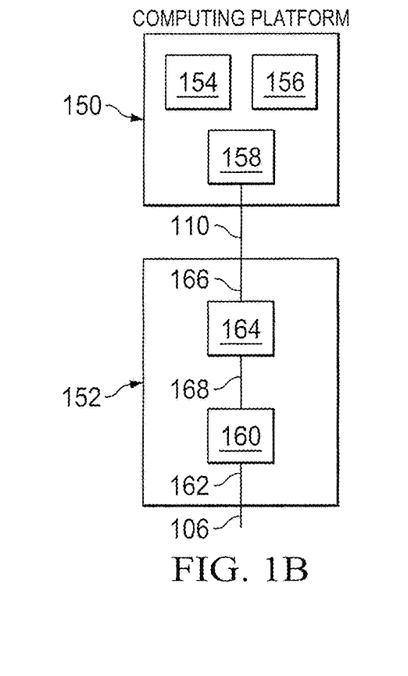

An example of this is shown in FIG. 1B, where a computing platform 150 is used in conjunction with a network interface device 152. The computing platform 150 represents any suitable computing device that can be used to virtualize at least one legacy or other device in an industrial process control and automation system. For example, the computing platform 150 could include one or more processing devices 154, one or more memories 156, and one or more network interfaces 158. Each processing device 154 includes any suitable processing or computing device, such as a microprocessor, microcontroller, digital signal processor, field programmable gate array (FPGA), application specific integrated circuit (ASIC), or discrete logic devices. Each memory 156 includes any suitable storage and retrieval device, such as a random access memory (RAM), Flash or other read-only memory (ROM), magnetic storage device, solid-state storage device, optical storage device, or other storage and retrieval device. Each interface 158 includes any suitable structure facilitating communication over a connection or network, such as a wired interface (like an Ethernet interface) or a wireless interface (like a radio frequency transceiver). In particular embodiments, the computing platform 150 could be used to virtualize any of the "Level 2" devices shown in FIG. 1A.

The network interface device 152 facilitates communication by the computing platform 150 over the LCN or other supervisory network 106, but the network interface device 152 communicates with the computing platform 150 over the advanced control network 110 (such as an Ethernet or FTE network). In some embodiments, the network interface device 152 includes or supports hardware 160, interface 162, hardware 164, interface 166, and interface 168. The hardware 160 is provided with the capability to host software performing the functionality of a "Level 2" device or other device. The interface 162 provides an interface for the hardware 160 to connect to and communicate on the LCN or other supervisory network 106. The hardware 164 acts as a bridge interface between the hardware 160 and the computing platform 150. The interface 166 provides an interface for the hardware 164 to connect to and communicate with the computing platform 150, such as via an Ethernet or FTE network. The interface 168 establishes communications between the hardware 160 and the hardware 164. The components 160-168 can be physically separate or operate on the same physical hardware but as distinct logical entities. In this scheme, the computing platform's applications access the data from the hardware 160 via the hardware 164.

The hardware 160 includes any suitable structure supporting "Level 2" or other supervisory functionality in an industrial process control and automation system. The hardware 164 includes any suitable structure supporting an interface between hardware providing supervisory functionality and a computing platform emulating a supervisory device. In some embodiments, each of the hardware 160, 164 is implemented using a printed circuit board (PCB). Each interface 162, 166, 168 includes any suitable structure for providing an interface to a network or device. In some embodiments, the interface 162 denotes an LCN interface, the interface 166 denotes an FTE interface, and the interface 168 denotes a communication bus. Additional details regarding the network interface device 152 are provided below.

In conventional systems, the virtualization of hardware can be prevented by the use of custom add-in cards, such as the LCNP4 card that performs the personality function of a TPS node. Moreover, the lifetime of a computing platform's support for internal interfaces (such as PCI bus physical connections) is typically shorter than the intended lifetime of an industrial control or automation device. Using the network interface device 152, which supports communications over a lower-level network, allows separation of the computing platform 150 from the network interface device 152. This approach therefore provides a solution that enables virtualization of one or more nodes by decoupling an operating system from the bus and LCN/supervisory network connections used to communicate with lower-level nodes while reducing obsolescence issues. This is accomplished by providing flexibility in terms of the structure of the computing platform 150 while maintaining the interface to the LCN or other supervisory network 106 via the network interface device 152.

Among other things, the approach described here can support any combination of the following features. First, this approach can increase the lifetime of support for an EXPERION or other software release by avoiding PC hardware obsolescence that requires OS updates. In the past, for example, moving from an obsolete server to a newer server with a newer peripheral bus often required extensive testing to ensure the newer server was compatible with existing control technology. The approach described here allows the computing platform 150 to be replaced without requiring extensive (or any) modifications to the network interface device 152. Second, this approach can increase system reliability by reducing the number of platforms through virtualization. With this approach, any number of higher-level components can be virtualized on one or more computing platforms 150, and the network interface device 152 provides a remote connection external of the computing platform hardware. Third, this approach can decrease support costs for replacing PC hardware when platforms are obsolete and replacements require software upgrades. For instance, major updates of a WINDOWS operating system may no longer require updates to or replacements of various "Level 2" devices since those "Level 2" devices can be virtualized. Fourth, this approach can decrease sensitivity to platform coupling by helping to virtualize the platform, thus making the introduction of newer technology simpler. Finally, this approach can decrease lifetime costs of a control system by extending the operational lifespan of and simplifying support for existing products.

Although FIGS. 1A and 1B illustrate one example of an industrial process control and automation system 100, various changes may be made to FIGS. 1A and 1B. For example, a control system could include any number of each component in any suitable arrangement. Components could be added, omitted, combined, or placed in any other suitable configuration according to particular needs. Also, particular functions have been described as being performed by particular components of the system 100. This is for illustration only. In general, process control and automation systems are highly configurable and can be configured in any suitable manner according to particular needs. In addition, FIGS. 1A and 1B illustrate an example environment in which a network interface device 152 can be used. The network interface device 152 can be used in any other suitable device or system.

Figure 2:
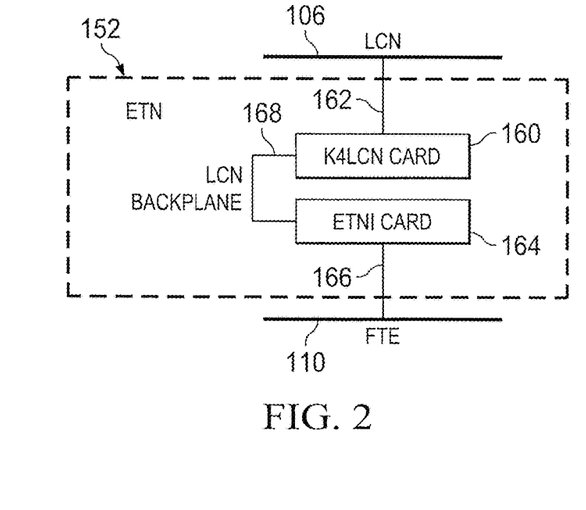
FIG. 2 illustrates an example network interface device according to this disclosure.

FIG. 2 illustrates an example network interface device 152 according to this disclosure. The example implementation of the network interface device 152 shown here could be used to enable the virtualization of HONEYWELL's EST, ESVT, ACET, and EAPP nodes connected to a legacy TDC 3000 LCN. However, the network interface device 152 could be used to support any other suitable functionality.

In this specific example, the hardware 160 is implemented using a K4LCN hardware card from HONEYWELL INTERNATIONAL INC. The K4LCN hardware card can be mounted on a standard LCN chassis and hosts the LCN software personality of an APPLICATION MODULE (AM) or a UNIVERSAL STATION (US) with special load module components as per the network configuration. Also, in this specific example, the interface 162 is implemented using an LCN input/output (I/O) board, which could be a standard interface board through which the K4LCN card communicates over an LCN or other supervisory network 106. Further, in this specific example, the hardware 164 is implemented using a hardware card, which can be referred to as an ENHANCED TPS NODE INTERFACE (ETNI). The ETNI hardware card can be mounted on the standard LCN chassis along with the K4LCN hardware card. Moreover, in this specific example, the interface 166 is implemented using an FTE I/O board, which is an interface board through which the ETNI card communicates with the computing platform 150 over an FTE or other advanced control network 110. In addition, in this specific example, the interface 168 is implemented using a backplane module bus of the LCN chassis and is the interface through which the ETNI card communicates with the K4LCN card.

The overall structure shown in FIG. 2 may be referred as an ENHANCED TPS NODE (ETN). The computing platform 150 and the hardware 164 can communicate over FTE using any standard or proprietary protocol, such as HONEYWELL's ETN communication protocol.

In some embodiments, the network interface device 152 could support different mechanisms for accessing the computing platform 150. For example, the implementation of the network interface device 152 with a K4LCN hardware card could include support for different hardware slots, such as the following:
  WSI2: To interface the K4LCN card with WINDOWS X-LAYER communication services running on the computing platform 150;
  PDG: To interface the K4LCN with the NATIVE WINDOW DISPLAY applications running on the computing platform 150; or
  SCSI: To enable the K4LCN card to access EMULATED DISK files residing on the computing platform 150.

Though the ETNI can represent a single card occupying a single physical slot on an LCN chassis, an FPGA implementation of the ETNI card could act as three devices as per configuration needs on the module bus of the LCN chassis, namely a WSI2 (Work Station Interface), a PDG (Peripheral Display Generator), and a SCSI (Smart Computer Systems Interface). These three different hardware interfaces can be implemented on a single ETNI board. The ETNI card can also be implemented with a mechanism to enable or disable any of these slots, such as automatically during start-up, which makes it a common interface that can be used for EAPP, ESVT, EST, and ACET nodes without any hardware/firmware changes. The slots used to support the ETNI for different types of devices can include the following:

EST: PDG, SCSI and WSI2

EAPP, ESVT and ACET: Only WSI2

These slots can be enabled or disabled dynamically based on the configuration from the computing platform 150.

Although FIG. 2 illustrates one example of a network interface device 152, various changes may be made to FIG. 2. For example, the types of networks and circuit cards shown in FIG. 2 are for illustration only. The use of particular protocols and interfaces (such as LCN, K4LCN, ETNI, and FTE interfaces) are for illustration only. Any other or additional interfaces can be used in or with one or more network interface devices 152 without departing from the scope of this disclosure. For instance, the supervisory network 106 could be implemented in the future as an IP/Ethernet-based network (such as an FTE-based LCN), and the network interface device 152 could support a suitable interface and hardware for that type of LCN.

Figure 3:
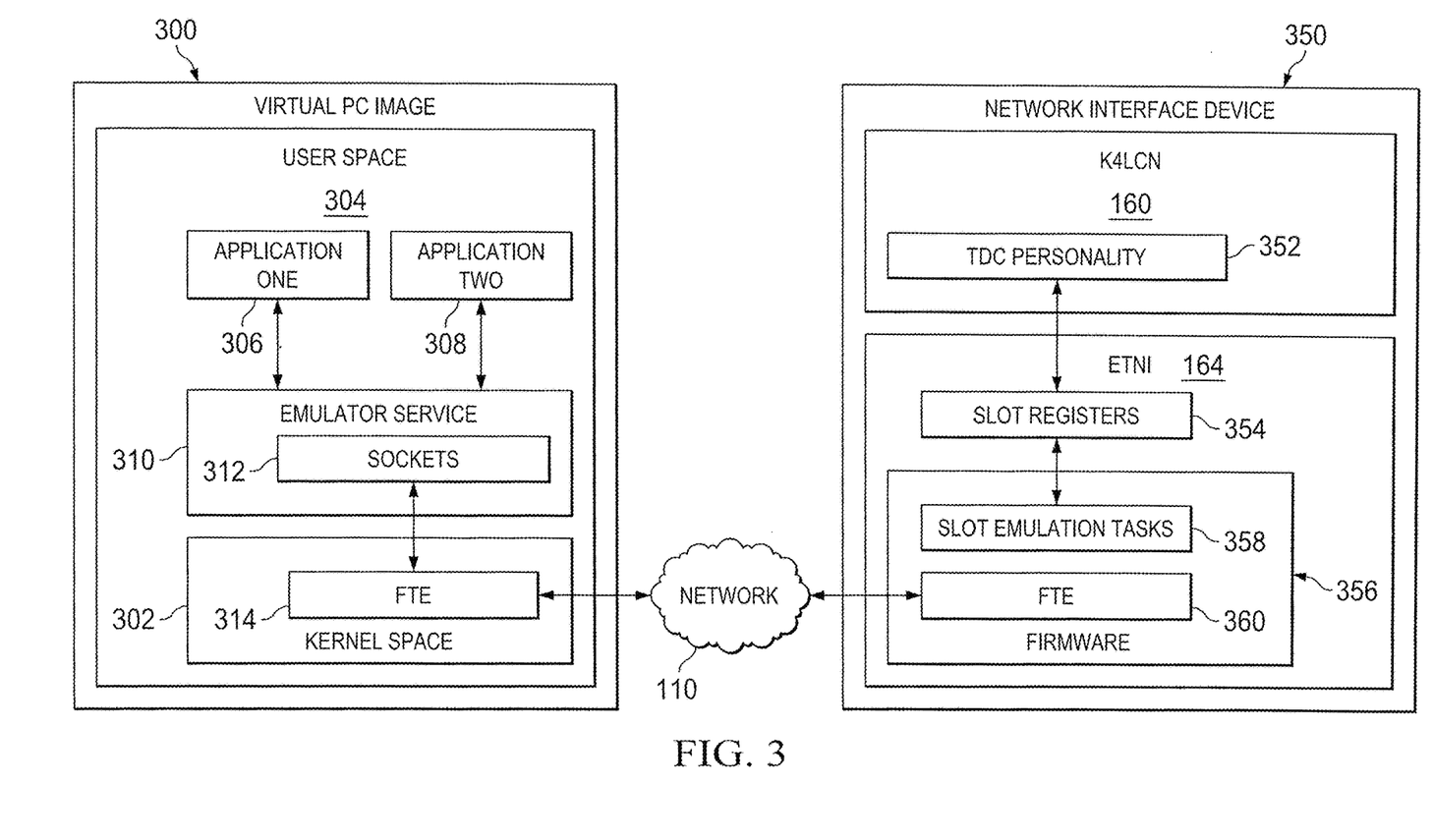
FIG. 3 illustrates example software architectures of components in an industrial control and automation system according to this disclosure.

FIG. 3 illustrates example software architectures of components in an industrial control and automation system according to this disclosure. More specifically, FIG. 3 illustrates an example high-level software architecture 300 of a computing platform 150 that virtualizes one or more legacy or other devices in a control and automation system. FIG. 3 also illustrates an example high-level software architecture 350 of a network interface device 152.

As shown in FIG. 3, the software architecture 300 includes a kernel space 302 and a user space 304. The kernel space 302 denotes the logical space within the software architecture 300 where the operating system's kernel executes for the computing platform 150. The user space 304 denotes the logical space within the software architecture 300 where other applications, such as applications 306-308, execute in the computing platform 150. Any suitable applications can be executed within the user space 304, such as a Local Control Network Processor (LCNP) status application or a NATIVE WINDOW DISPLAY application.

An emulator service 310 is also executed within the user space 304. The emulator service 310 operates to emulate the physical interfaces that virtualized devices expect to be present at the computing platform 150 (but that are actually implemented remotely at the network interface devices 152). For example, the emulator service 310 could emulate the circuit cards that are expected in different virtualized slots. As a particular example, slot 2 could be a WSI card, Slot 3 could be a SCSI card, and Slot 4 could be an Enhanced Peripheral Display Generator (EPDG) card.

The emulator service 310 also supports the use of one or more sockets 312, which are used to communicate via an FTE module 314 in the kernel space 302. The FTE module 314 supports various functions allowing redundant communications over the advanced control network 110, such as heartbeat signaling and processing. Although not shown, the kernel space 302 could support various other features, such as emulated TOTAL DISTRIBUTED CONTROL (TDC) memory, slot registers, and LCNP4e registers.

The software architecture 350 includes a TDC personality 352 in the hardware 160. The TDC personality 352 denotes one or more software routines that provide the personality function of a TPS node. From the perspective of other devices connected to the LCN or other supervisory network 106, the TDC personality 352 causes the network interface devices 152 to appear as a standard supervisory device, even though the actual functionality of the supervisory device is virtualized and executed by the computing platform 150. The TDC personality 352 communicates with slot registers 354 in the hardware 164, which could be implemented using an FPGA or other suitable structure. In particular embodiments, the slot registers 354 could include three standard slot register sets that are expected in any standard TDC device.

Firmware 356 executed by the hardware 164 includes slot emulation tasks 358 and an FTE module 360. Among other things, the slot emulation tasks 358 can emulate the operations needed to interact with the TDC personality 352. For example, the WSI subsystem of a conventional TDC personality 352 sets up WSI slot registers with mailboxes and semaphores and manages a linked list of TDC memory data buffers. The WSI subsystem also watches the mailboxes for data buffers going to the TDC personality 352 and places data buffers into the mailboxes coming from the TDC personality 352. The slot emulation tasks 358 could emulate these functions to support data transfers to and from the computing platform 150 via the network 110. The FTE module 360 supports various functions allowing redundant communications over the advanced control network 110, such as heartbeat signaling and processing.

Although FIG. 3 illustrates examples of software architectures 300, 350 of components in an industrial control and automation system, various changes may be made to FIG. 3. For example, the particular mechanisms shown here for supporting interactions between the computing platform 150 and the network interface device 152 are examples only. Also, the types of networks and circuit cards shown in FIG. 3 are for illustration only.

Figure 4:
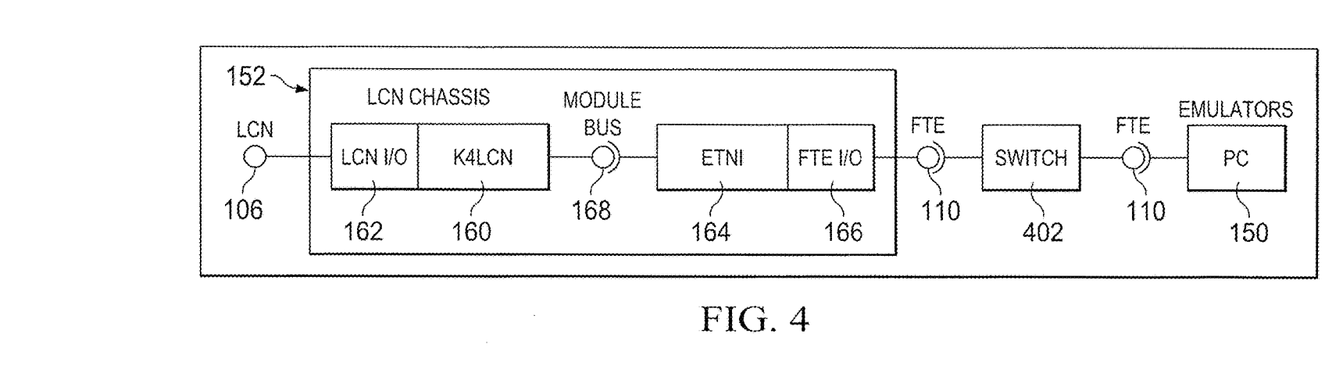
FIGS. 4 through 7 illustrate example systems using the network interface device according to this disclosure.

FIGS. 4 through 7 illustrate example systems using network interface devices 152 according to this disclosure. As shown in FIG. 4, the network interface device 152 is coupled to an LCN or other supervisory network 106. The network interface device 152 is also coupled to an FTE or other advanced control network 110, namely a network switch 402 that supports communications between the network interface device 152 and the computer platform 150. The network switch 402 supports data transport between the network interface device 152 and the computer platform 150 in accordance with an advanced control network protocol.

Figure 5:
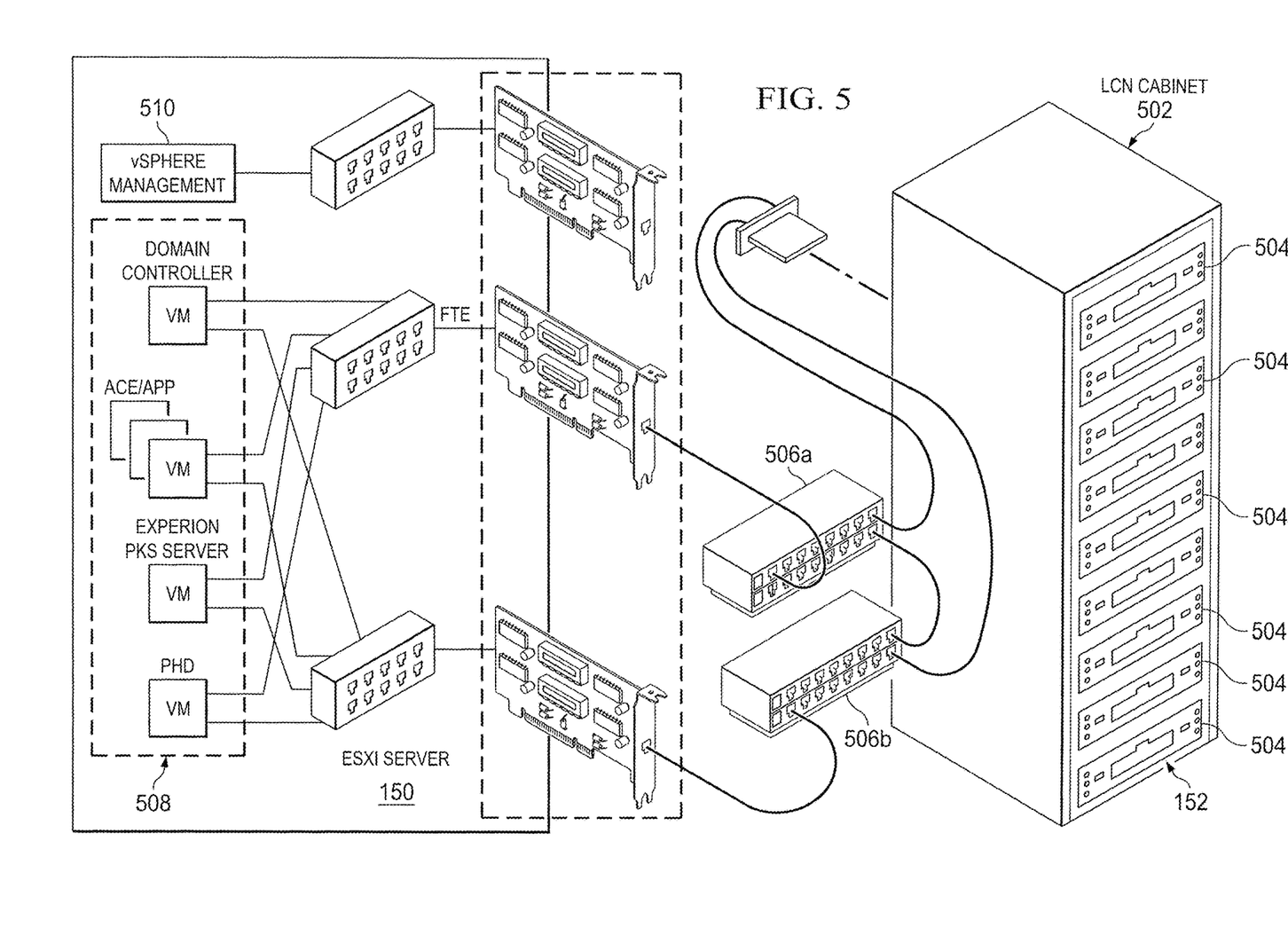

As shown in FIG. 5, the network interface device 152 is implemented using a chassis 502, which includes various dual node card file assemblies (CFAs) 504. The CFAs 504 can receive various circuit boards, including the hardware cards implementing the hardware 160, the interface 162, the hardware 164, and the interface 166. A backplane of the chassis 502 could be used as the interface 168.

The chassis 502 is coupled to two network switches 506a-506b, which are coupled to the computing platform 150. In this example, the computing platform 150 supports a virtualization environment in which various virtual machines (VMs) 508 can be executed. The virtual machines 508 can virtualize a variety of industrial control and automation applications. In this example, the virtual machines 508 virtualize HONEYWELL EXPERION PKS server, ACE/APP, PROCESS HISTORY DATABASE (PHD), and domain controller applications. A management application 510 supports various management functions for controlling the virtualization environment. In this particular implementation, the virtualization environment is supported using VMWARE ESXI SERVER software, and the management application 510 denotes the VMWARE VSPHERE MANAGEMENT application. Note, however, that any suitable virtualization software and management application could be used. Also note that the computing platform 150 could be implemented using a "bare metal" approach.

Figure 6:
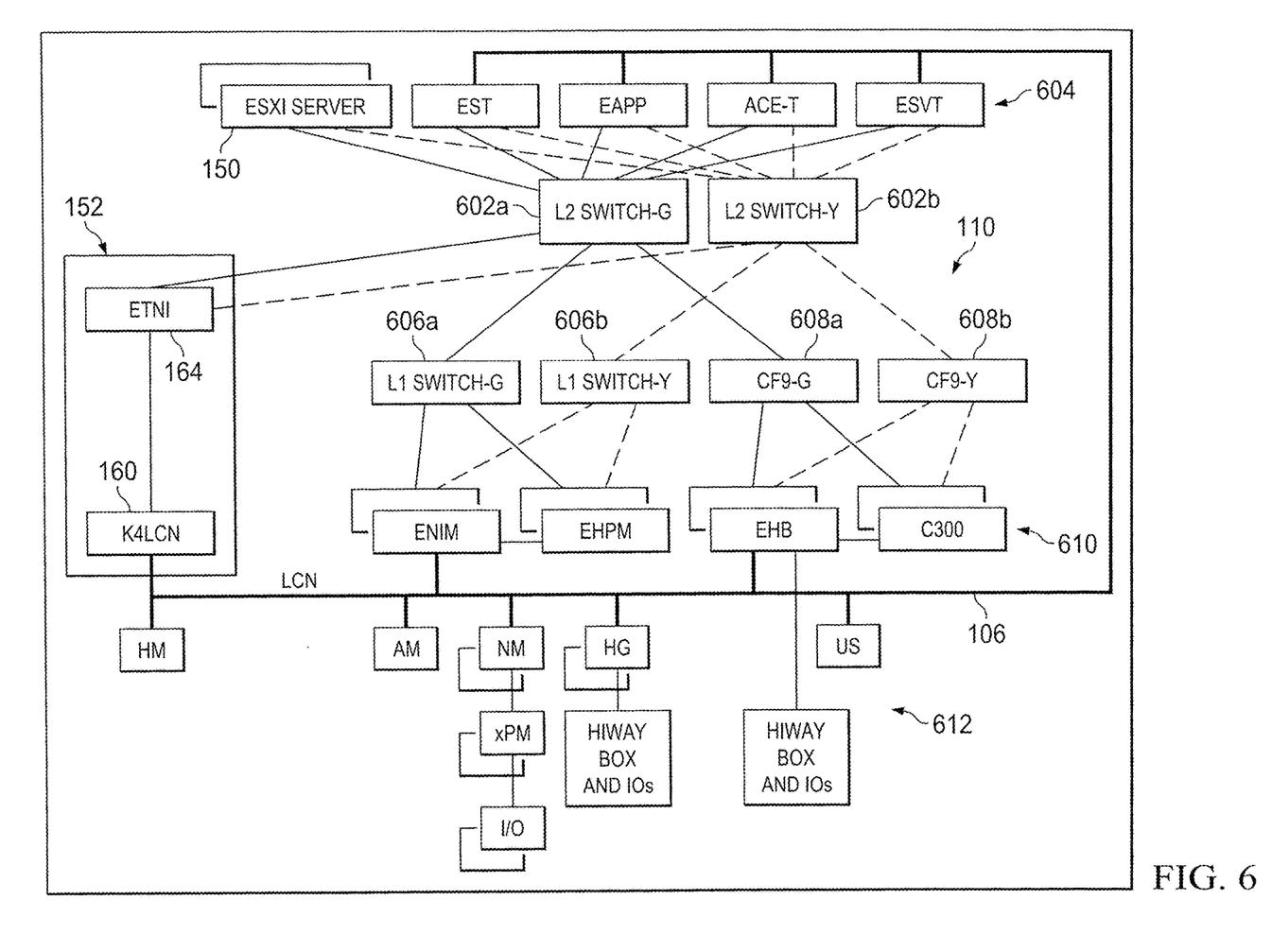

As shown in FIG. 6, the network interface device 152 is coupled to a redundant pair of "Level 2" network switches 602a-602b, which support an FTE network as the advanced control network 110. The switches 602a-602b are coupled to "Level 2" devices such as EXPERION TPS nodes 604. The switches 602a-602b are also coupled to a redundant pair of "Level 1" network switches 606a-606b and a redundant pair of firewalls 608a-608b, such as HONEYWELL CONTROL FIREWALL (CF9) devices. Various devices 610 are coupled to the "Level 1" network switches 606a-606b and the firewalls 608a-608b, and devices 610-612 are coupled to the LCN or other supervisory network 106.

Figure 7:
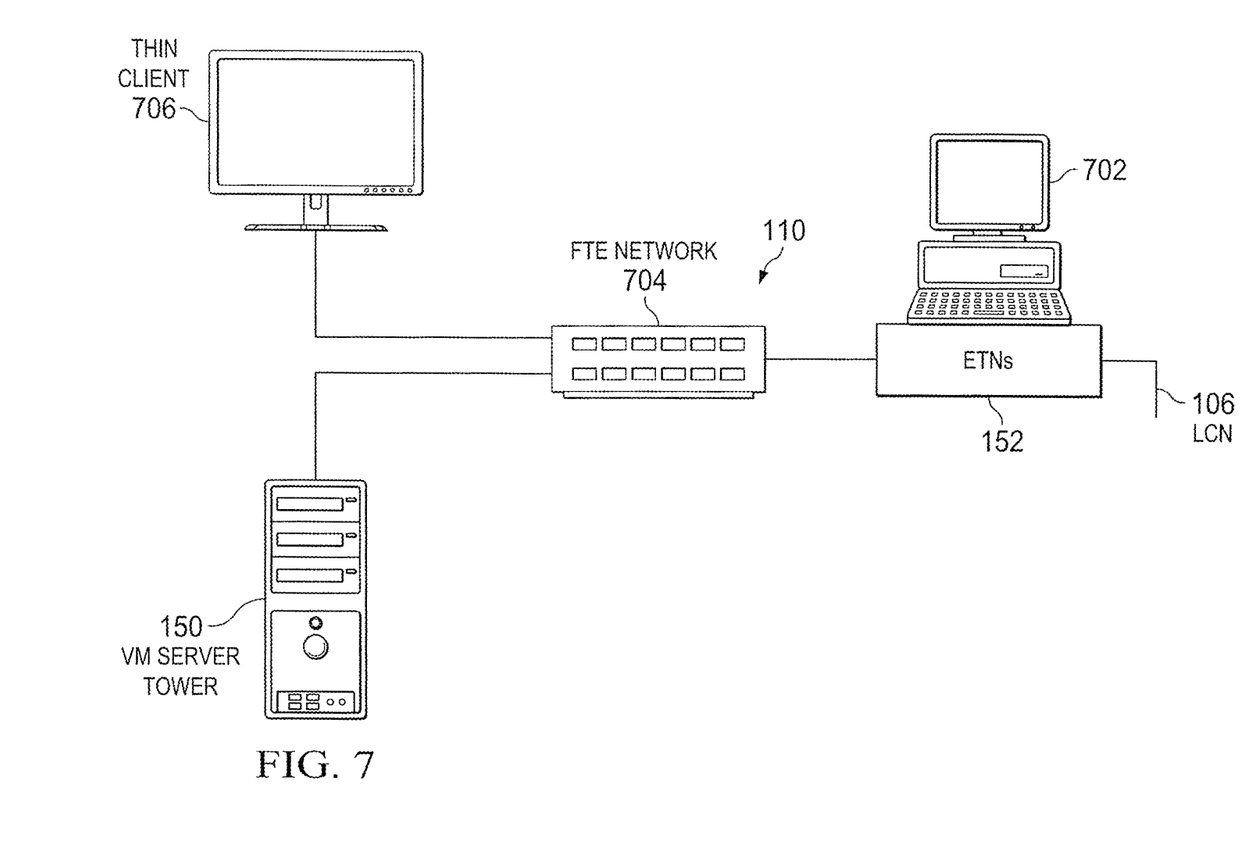

As shown in FIG. 7, one or more network interface devices 152 are mounted to an operator console 702 and coupled to a switch 704 over an FTE or other advanced control network 110. The computing platform 150 is implemented here as a computing tower, although any other suitable form could be used. A thin client 706 denotes a platform that can be used as a way to remote the keyboard, mouse, custom keyboard, and monitor mounted in the console furniture of the operator console 702.

Although FIGS. 4 through 7 illustrate examples of systems using network interface devices 152, various changes may be made to FIGS. 4 through 7. For example, these figures are meant to illustrate general examples of the types of ways in which the network interface device 152 could be implemented and used. However, the network interface device 152 could be implemented and used in any other suitable manner.

Figure 8:
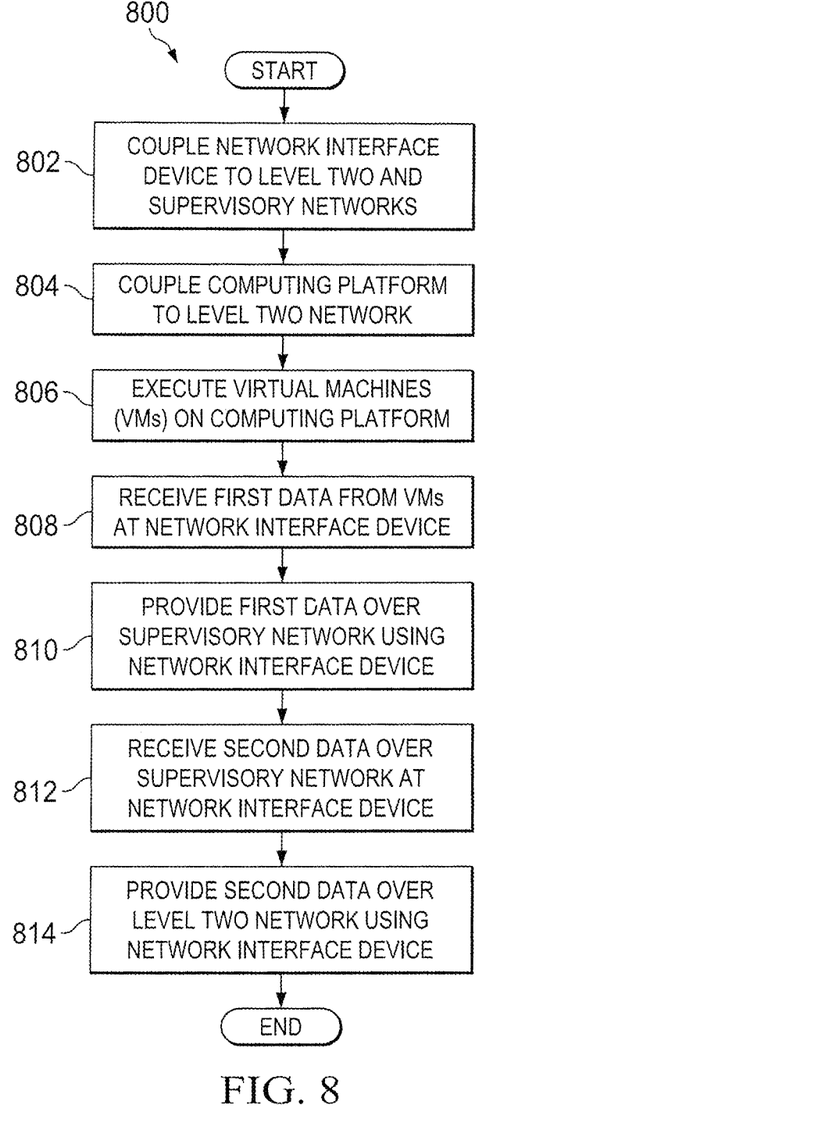
FIG. 8 illustrates an example method for virtualization of a connection to a node in an industrial control and automation system according to this disclosure.

FIG. 8 illustrates an example method 800 for virtualization of a connection to a node in an industrial control and automation system according to this disclosure. As shown in FIG. 8, a network interface device is coupled to a "Level 2" network and a supervisory network at step 802. This could include, for example, coupling the network interface device 152 to an FTE or other advanced control network 110 and an LCN or other supervisory network 106.

A computing platform is coupled to the "Level 2" network at step 804. This could include, for example, coupling a computing platform 150 to the FTE or other advanced control network 110. One or more virtual machines are executed on the computing platform at step 806. This could include, for example, executing virtual machines that virtualize various industrial process control and automation Level 2 devices on the computing platform 150.

The network interface device bridges the virtualized components executing on the computing platform and lower-level devices accessible via the LCN or other supervisory network. For example, first data is received from one or more virtual machines at the network interface device at step 808 and provided over the supervisory network by the network interface device at step 810. This could include, for example, the network interface device 152 receiving data from the computing platform 150 over the FTE or other advanced control network 110 (via the hardware 164 and interface 166) and providing the first data over the LCN or other supervisory network 106 (via the hardware 160 and interface 162). Similarly, second data is received from the supervisory network at the network interface device at step 812 and provided to one or more virtual machines over the Level 2 network at step 814. This could include, for example, the network interface device 152 receiving data from lower-level devices over the LCN or other supervisory network 106 (via the hardware 160 and interface 162) and providing the second data to the computing platform 150 over the FTE or other advanced control network 110 (via the hardware 164 and interface 166). The interface 168 supports data transport between the hardware 160 and the hardware 164.

In this way, the actual interface to an LCN or other supervisory network 106 is supported by the network interface device 152, which is separated from the computing platform 150 that executes virtualized control components. The virtualized control components can therefore be added, modified, or removed more easily since the control components are not tied to special hardware interfaces.

Although FIG. 8 illustrates one example of a method 800 for virtualization of a connection to a node in an industrial control and automation system, various changes may be made to FIG. 8. For example, while shown as a series of steps, various steps in FIG. 8 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one first hardware card configured to communicate, via a first hardware interface, over a local control network (LCN) with one or more components of an industrial process control and automation system;

wherein the at least one first hardware card comprises an emulated personality of a supervisory device that would communicate over the LCN;

at least one second hardware card configured to communicate, via a second hardware interface, over a redundant Ethernet network with a computing platform that virtualizes at least one other component of the industrial process control and automation system wherein the at least one second hardware card comprises slot registers configured to store data being transferred to and from the emulated personality; and a third interface configured to transport information between the at least one first hardware card and the at least one second hardware card.

2. The apparatus of claim 1, wherein the apparatus is configured to provide a remote connection into the LCN for the at least one other component virtualized by the computing platform.

3. The apparatus of claim 1, wherein the at least one second hardware card is configured to perform one or more slot emulation tasks to support data transfer between the slot registers and the computing platform.

4. The apparatus of claim 1, wherein the third interface comprises a backplane of an LCN chassis configured to receive the at least one first hardware card and the at least one second hardware card.

5. The apparatus of claim 1, wherein:

the at least one second hardware card is configured to occupy a single slot of a chassis; and the at least one second hardware card is configured to support multiple hardware interfaces and is configured to enable or disable each of the multiple hardware interfaces.

6. A method comprising:

using at least one first hardware card of a network interface device to communicate, via a first hardware interface, over a local control network (LCN) with one or more components of an industrial process control and automation system;

emulating a personality of a supervisory device that would communicate over the LCN using the at least one first hardware card;

using at least one second hardware card of the network interface device to communicate, via a second hardware interface, over a redundant Ethernet network with a computing platform that virtualizes at least one other component of the industrial process control and automation system;

transporting information between the at least one first hardware card and the at least one second hardware card using a third interface of the network interface device; and storing data being transferred to and from the emulated personality using slot registers of the at least one second hardware card.

7. The method of claim 6, wherein the network interface device provides a remote connection into the LCN for the at least one other component virtualized by the computing platform.

8. The method of claim 6, further comprising: performing one or more slot emulation tasks to support data transfer between the slot registers and the computing platform using the at least one second hardware card.

9. The method of claim 6, wherein the third interface comprises a backplane of an LCN chassis configured to receive the at least one first hardware card and the at least one second hardware card.

10. The method of claim 6, wherein:

the at least one second hardware card occupies a single slot of a chassis;

the at least one second hardware card is configured to support multiple hardware interfaces; and the method further comprises enabling or disabling each of the multiple hardware interfaces.

11. The apparatus of claim 1, wherein the first hardware interface comprises an LCN input/output (I/O) board.

* * * * *